(12) United States Patent
Ha

(10) Patent No.: US 6,443,583 B1
(45) Date of Patent: *Sep. 3, 2002

(54) BACKLIGHT OF A LIQUID CRYSTAL DISPLAY DEVICE

(75) Inventor: Kyoung Su Ha, Pusan (KR)

(73) Assignee: LG.Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/518,818

(22) Filed: Mar. 3, 2000

(30) Foreign Application Priority Data

Nov. 3, 1999 (KR) .............................................. 99-8111

(51) Int. Cl.[7] .............................................. F21V 33/00
(52) U.S. Cl. .............................. 362/31; 362/26; 349/65
(58) Field of Search ........................... 362/31, 317, 19, 362/26, 561, 330; 349/65, 67

(56) References Cited

U.S. PATENT DOCUMENTS 5,594,830 A * 1/1997 Winston et al. ............. 385/146
5,688,035 A * 11/1997 Kashima et al. ............. 362/31
5,719,649 A * 2/1998 Shono et al. ................. 362/31
5,886,759 A * 3/1999 Mashino et al. .............. 349/65

FOREIGN PATENT DOCUMENTS

| JP | 5053111 | 3/1993 |
| JP | 6300923 | 10/1994 |
| JP | 7288019 | 10/1995 |
| JP | 10161114 | 6/1998 |
| JP | 8327828 | 8/1998 |

* cited by examiner

Primary Examiner—Sandra O'Shea
Assistant Examiner—Bao Truong
(74) Attorney, Agent, or Firm—McKenna, Long & Aldridge LLP

(57) ABSTRACT

A backlight has a light source housing, having a light concentrating portion and fixing portions, and an opening, wherein the opening's upper and lower sides, namely, the upper and lower boundaries between the light concentrating portion and the fixing portions on the housing are located vertically between the upper and lower sides of the light entering surface of the light pipe. Therefore, light is prevented from entering the gap between the housing and the light pipe, and is instead reflected on the inner surface of the light concentrating portion to enter the light pipe through the light entering surface, so that the entering light contributes to improve the brightness of the collimated light.

20 Claims, 13 Drawing Sheets

PROIR ART

BACKLIGHT OF A LIQUID CRYSTAL DISPLAY DEVICE

This application claims the benefit of Korean Patent Application No. 1999-8111, filed on Mar. 11, 1999, which is hereby incorporated by reference for all purposes as if fully set forth herein.

BACKGROUND OF THE INVENTION

1. Field of the Invention

The present invention relates to a liquid crystal display device (LCD), and more particularly to a backlight of the liquid crystal display device.

2. Discussion of the Related Art

A liquid crystal display device is widely used for a note book computer or a portable TV and generally comprises a liquid crystal panel and a backlight to provide a uniform collimated light to the liquid crystal panel. The liquid crystal panel basically comprises an upper substrate, a lower substrate, and a liquid crystal layer between the two substrates.

As shown in FIG. 1, the backlight generally comprises a light source 1; a light source housing 3 both for protecting the light source 1 and for concentrating light from the light source 1; a light pipe or light guide 4; a reflecting plate 6 on a lower surface of the light pipe 4; a light dispersing film 7 over an upper surface of the light pipe 4; one or two lens films 8 over the light dispersing film 7; and a protecting film 9 over the lens films 8. The backlight provides a uniform collimated light to the liquid crystal panel.

Scattering patterns are formed on a predetermined region of the light pipe 4 to scatter light which is trapped within the light pipe 4 by total internal reflection. The light pipe 4 is divided into a non-display region A and a display region B.

Light emitted from the light source 1 is incident on a light entering surface 2 of the light pipe 4, and being totally reflected, the incident light travels within the light pipe 4 by the non-display and display regions A and B in the named order. The light trapped within the light pipe 4 is scattered by the scattering patterns, destroying the total internal reflection condition, and the light partially comes out of the light pipe 4 through the upper surface so that a uniform collimated light is provided to the liquid crystal panel. The light reflecting plate 6 under the light pipe 4 reflects light coming out of the light pipe 4 through its lower surface, improving the light utilization ratio. The scattering film 7 imparts an optimum uniformity and directionality to the exit light. The lens film 8 concentrates the light into a predetermined direction, preventing a bad image. The protecting film 9 protects the lens film 8, increases the light uniformity, and enlarges the viewing angle range by properly dispersing the light.

As mentioned above, after entering the light pipe 4 through the light entering surface 2, the light exits from the light pipe 4 when scattered by the scattering patterns. The density of the scattering patterns is determined so that the display region B is provided with a uniform collimated light.

However, as shown in FIGS. 2a or 2b, light can enter the upper and lower surfaces of the light pipe 4 or the rounded surfaces 2a and 2b through a gap between the light source housing 3 and the light pipe 4. Most of the light which enters the light pipe 4 through the upper surface of the light pipe 4 is directed to the display region B without total internal reflection and light dispersion, resulting in a bright line. Referring to light paths shown in the Figures, it can be understood that the position of the bright line on the upper surface of the light pipe 4 is changed according to its incident angle, and is changed according to the exit angle.

FIG. 2c is a graph showing the exit position (Y, mm) with respect to the exit angle (X, degree) of the bright line mentioned above. where the tested value T is compared with the computed value C. As shown in FIG. 2d, the exit position Y is defined as a horizontal distance between the incident surface 2 and the exit position, and the exit angle X is defined as an angle between the normal direction and the exit direction S. This test and computation are performed with a light pipe having a thickness of 2.6 mm and without any optical film such as a dispersing film, and a lens film.

Two causes of the bright line can be seen by FIG. 2a and FIG. 2b, respectively. The relationship shown in FIG. 2C applies to both cases. When there is a large gap between the light source housing 3 and the light pipe 4, the bright line of FIG. 2a increases, and when there are large rounded surfaces 2a and 2b on the light pipe 4, the bright line of FIG. 2b increases. The rounded surfaces 2a and 2b are results from an inaccurate molding process. It is more difficult to prevent the bright line caused by the rounded surfaces in comparison, with the bright line of the gap between the light source housing 3 and the light pipe 4. Thus, the light pipe 4 is typically manufactured to make the edges without the rounded surfaces. Accordingly, the following explanations are mainly given for the bright line caused by the gap between the light pipe and the light source housing.

As shown in FIG. 3, printed regions 11, 12, and 13 are conventionally formed, respectively, on the light pipe 4, reflecting plate 6, and the dispersing plate 7 in the light path of the bright line in order to prevent the bright line. In this figure, the same elements as in FIG. 1 are indicated by same numerals without further explanation of the structure. Light incident on the upper surface of the light pipe 4 is weakened by absorption and scattering by the black printed region 11 on the upper surface of the light pipe 4, and the weakened light is further weakened by absorption, reflection and scattering by the black printed region 12 on the reflecting plate 6. Finally, the weakened light is scattered and removed by the white printed region 13 on the dispersing film 7.

Light entering a gap between the lower surface of the light pipe 4 and the reflecting plate 6 also is weakened by absorption and scattering by the black printed region 12, and then scattered and removed by the white printed region 13 on the dispersing film 7.

The structure described above to prevent the bright line has the following problems.

First, the manufacturing process is complicated to form the printed regions on the light pipe 4, the reflecting plate 6, and the dispersing film 7, and print degradation is easily generated, increasing the manufacturing cost.

Second, the printing regions are liable to weaken light which does not cause the bright line, decreasing the brightness of the collimated light provided to the liquid crystal panel. When using all of the printing regions on the light pipe 4, reflecting plate 6, and the dispersing film 7 to entirely remove the bright line, the light brightness is lowered by 3%–6%.

Third, a black stripe image comes in sight when using a deep black printing region, namely, it is difficult to determine a proper depth of black.

Fourth, there is a possible error of 0.5 mm in the vertical positions of the reflecting plate 6 and the dispersion film 7. Thus, the reflecting plate 6 may enter the light source housing 3, so that the black printing region 12 absorbs light incident on the light entering surface 2, decreasing the light brightness of the backlight. Further, the reflecting plate 6 may be so far removed from the light source housing 3 as to fail to remove the bright line by the black printing region 12. Further, if the dispersion film 7 is not correctly located, white and black stripes can be seen vaguely. Actually, the vague white and black strips are inevitable unless the reflecting plate 6 and the dispersing film 7 are fixed.

SUMMARY OF THE INVENTION

Accordingly, the present invention is directed to a backlight of a liquid crystal display device that substantially obviates one or more of the problems due to limitations and disadvantages of the related art.

An object of the present invention is to provide a backlight of a liquid crystal display device which can provide a bright and uniform collimated light without generating a bright line.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a backlight of a liquid crystal display device which comprises:

a light pipe having a first surface as a top surface, a second surface as a bottom surface, and an end surface as a light entering surface, wherein the first surface is connected to the end surface through a first boundary and the second surface is connected to the end surface through a second boundary;

a light source facing the light entering surface; and a light source housing including a light concentrating portion and a fixing portion; wherein the light concentrating portion has an inner space where the light source is located and an opening facing the end surface; wherein the opening is defined by first and second sides and at least one of the two sides is located vertically between the first boundary and the second boundary; and wherein the fixing portion is connected to the light concentrating portion through the opening and has an end located on at least one of the first and second surfaces.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain principles of the invention.

In the drawings.

DETAILED DESCRIPTION OF THE PREFERRED EMBODIMENTS

Reference will now be made in detail to the preferred embodiments, examples of which are illustrated in the accompanying drawings.

Figure 4A:
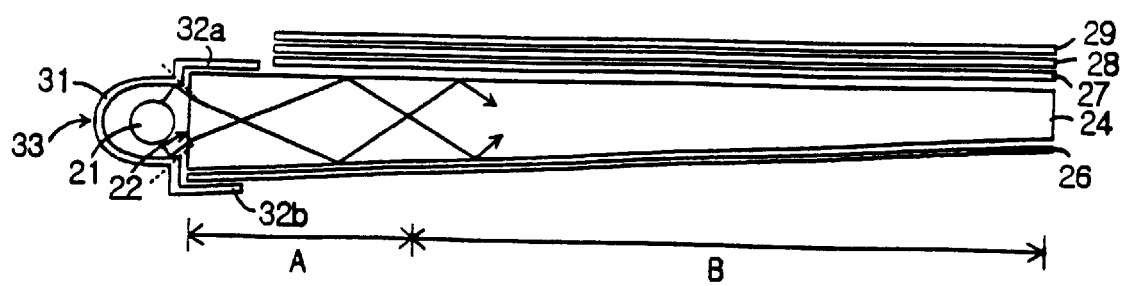
FIG. 4a is a backlight of a first embodiment according to the present invention.

FIG. 4a shows a first embodiment. As shown in this figure, a backlight of this embodiment comprises a light pipe 24 having a light entering surface 22; a reflecting plate 26 facing a lower surface of the light pipe 24; a dispersing film 27, lens film 28 and protecting film 29 over an upper surface of the light pipe 24; a light source 21 facing the light entering surface 22; a light source housing 33 which protects the light source 21 and comprises a light concentrating portion 31, and upper and lower fixing portions 32a and 32b. The dotted lines indicate the boundaries between the light concentrating portion 31 and the fixing portions 32 and 32b, respectively.

The present invention is characterized in that the light concentrating portion 31 has an opening defined by its upper and lower sides, and at least one of the two sides of the opening is located vertically between upper and lower sides of the light entering surface 22.

The fixing portions 32a and 32b are formed to be integrated with the light concentrating portion 31, and have upper and lower ends which define an opening of the fixing portions 32a and 32b and encompass the light entering surface 22. Accordingly, the upper and lower ends of the fixing portion 32a and 32b face the upper and lower surfaces of the light pipe 24, respectively. Although the figure shows that the fixing portions 32a and 32b are bent at a right angle, they may be bent at any angle, or bent with a rounded curve to have a continuous surface.

Figure 3:
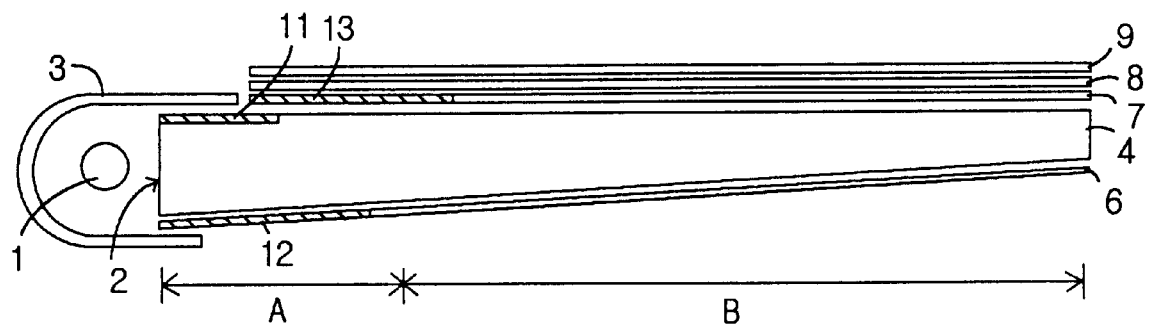
FIG. 3 is a sectional view showing a backlight according to a related art technique for preventing the bright line.
Figure 4B:
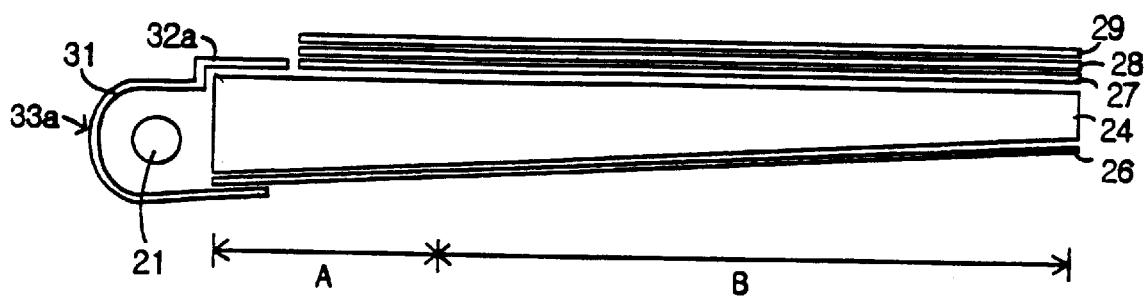
FIGS. 4b and 4c are views showing modifications of the first embodiment.
Figure 4C:
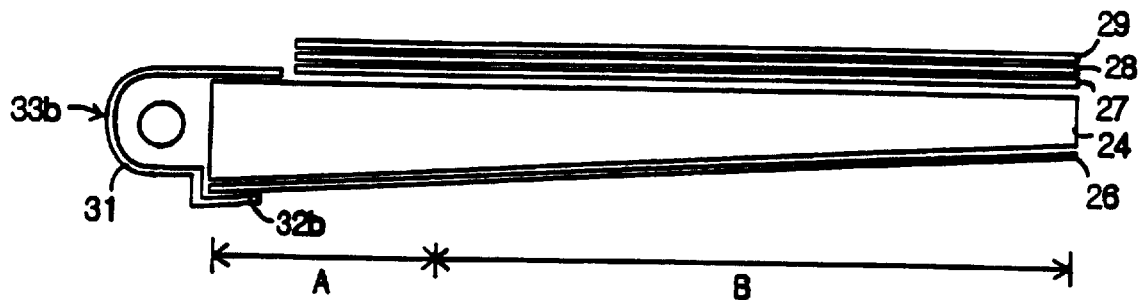

As shown in FIG. 3, there is a gap between the light source housing 3 and the upper and lower surfaces of the light pipe 4, and a bright line causing light enters the gap. Whereas the prior art prevents the bright line by scattering and absorption, the present invention has a bright line preventing structure of the light source housing 33 which blocks the bright line causing light from entering the gap. Light beams shown in FIG. 4a would have become a bright line in the prior art. However, because the upper and lower sides of the light concentrating portion 31 opening are located vertically between upper and lower sides of the light entering surface 22, the light beams are prevented from entering the gap, and reflected on inner surfaces of the light concentrating portion 31 to enter the light pipe 24 through the light entering surface 22. The light beam contributes to improve the brightness of the collimated light. Also when one of the upper and lower sides of the opening is located vertically between the upper and lower sides of the light entering surface, the bright line can be prevented. Accordingly, in the backlight, only an upper part of the light source housing 33a may have a bright line preventing structure as shown in FIG. 4b, and conversely only a lower part of the light source housing 33b may have a bright line preventing structure as shown in FIG. 4c. In FIGS. 4b and 4c, the same elements as in FIG. 4a are indicated by same numerals without explanation of the structure.

Hereinafter, the bright line preventing principles are explained in detail referring to FIGS. 5a to 5d. In these Figures, the light source housing and the light pipe are represented only by their outlines, and the same elements as in FIG. 4a are indicated by same numerals without further explanation of the structure.

Figure 5A:
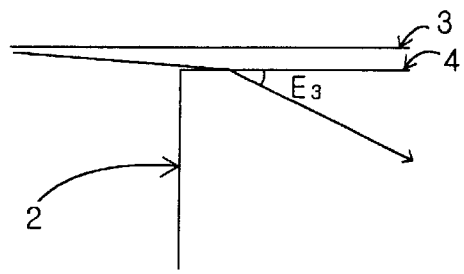
FIGS. 5a and 5b are views showing the bright line causing light of the prior art.
Figure 5B:
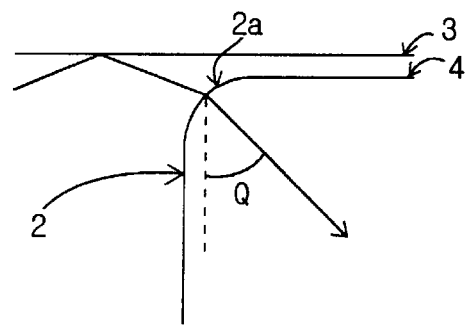

In the prior art, as shown in FIG. 5a, lights which enter the gap at any incident angle cause a bright line. In the prior art as shown in FIG. 5b, lights incident on the rounded surface 2a produce a bright line if an angle Q is less than $\sin^{-1}(1/1.49)$ according to Snell's law.

Figure 5C:
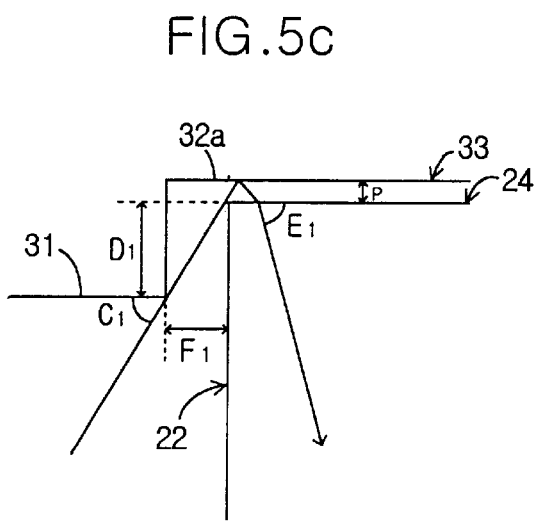
FIGS. 5c and 5d are views for explaining the bright line preventing effect of the first embodiment.
Figure 5D:
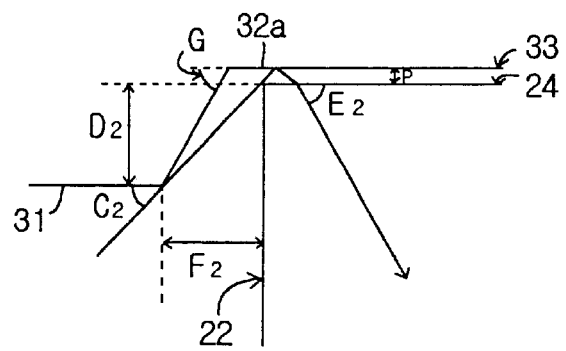

On the other hand, in the embodiment as shown in FIG. 5C, light cannot enter the gap if an inner angle between its traveling direction and the horizontal direction of the light pipe 4 is less than an angle $C_1$. Further, as shown in FIG. 5d, when a bent angle G is not 90 degrees, light cannot enter the gap if the inner angle is less than an angle $C_2$. Accordingly, the amount of the bright line causing lights is reduced, and the bright line can be removed using only the dispersion film and the scattering patterns of the light pipe 24, which are essential elements of a backlight, without the printing regions for removing the bright line.

In FIGS. 5c and 5d, $D_1$ and $D_2$ indicate vertical distances between the upper side of the opening of the light concentration portion 31 and the upper side of the light entering surface. $F_1$ and $F_2$ indicate horizontal distances between the upper side of the opening of the light concentration portion 31 and the light entering surface 22. $E_1$ and $E_2$ indicate a minimum refracted angle of the bright line causing light with respect to the upper surface of the light pipe 24. In FIG. 5a, $E_3$ indicates a minimum refracted angle of the bright line causing light with respect to the upper surface of the light pipe 4 in the prior art.

Equations for the above-mentioned parameters are as follows.

$C_1=\tan^{-1}(D_1/F_1)$, $C_2=\tan^{-1}(D_2/F_2)$, $E_1=90°-\sin^{-1}(\sin(90°-C_1)/\text{refractive index of the light pipe}))$, $E_2=90°-\sin^{-1}(\sin(90°-C_2)/\text{the refractive index})$, and $E_3=90°-\sin^{-1}(1/\text{the refractive index})$.

Figure 6:
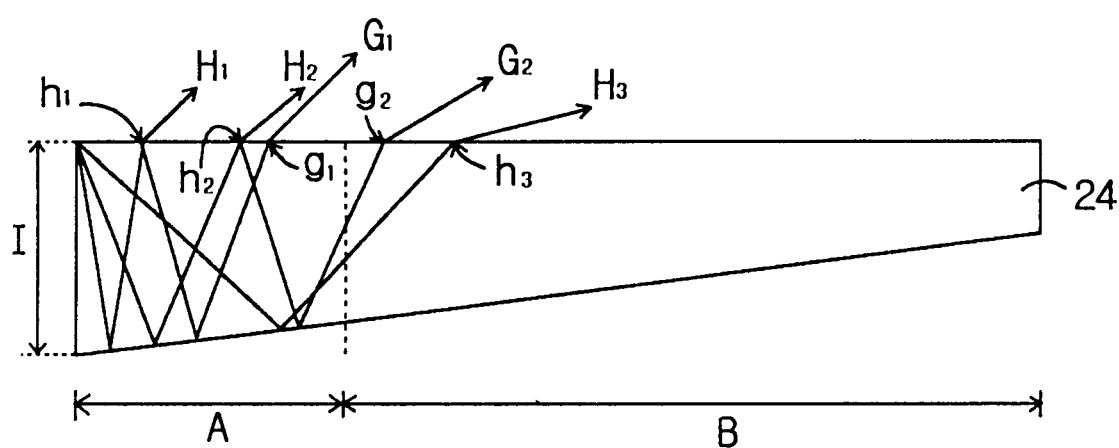
FIG. 6 is a view showing light paths of the prior art and the first embodiment.

In FIG. 6, explanations are made for each path of the bright line causing light incident at a maximum incident angle onto the upper surface of the light pipe as shown in FIGS. 5a, 5c, and 5d.

Because the angle $E_3$ of FIG. 5a must be less than angles $E_1$ and $E_2$ of FIGS. 5c and 5d, the corresponding bright line causing light $H_3$ of the related art, as shown in FIG. 6, reaches farther than the bright line causing lights $H_1$ and $H_2$ according to the first embodiment. Accordingly, the bright line causing light $H_3$ has more possibility to be seen in the display region B than the bright line causing lights $H_1$ and $H_2$. Further, gaps $F_1$ and $F_2$ denoted in FIG. 5 can be controlled to be sufficiently small in order to completely remove the bright line or limit most of the bright line causing light to the non-display region A. Even though the gaps $F_1$ and $F_2$ are not zero, most of the bright line causing lights which would become bright lines in the related art enters the light entering surface and does not produce a bright line, even without the use of the printing regions for removing the bright line.

The following equations are relations of the horizontal distances $h_1$, $h_2$, and $h_3$ between the light entering surface and the exit position of the bright ling causing light on the upper surface of the light pipe 24; a vertical width I of the light entering surface; and refractive angles $E_1$, $E_2$, and $E_3$ denoted in FIGS. 5a, 5c, and 5d.

$h_1=2I\tan(90-E_1)$, $h_2=2I\tan(90-E_2)$, $h_3=2I\tan(90-E_3)$

When the bright line causing light encounters first the upper surface in the non-display region A, the exit light $H_1$ and $H_2$ may be seen in the display region only after being subjected to a lot of absorption and scattering in the backlight. Therefore, the lights $H_1$ and $H_2$ do not cause bright lines.

When the bright line causing lights $G_1$ and $G_2$ exit through positions $g_1$ and $g_2$ after internal reflection, the exit lights $G_1$ and $G_2$ do not cause bright lines because they are twice scattered by the scattering patterns in the light pipe 24 during internal reflection.

Thus, the amount of the bright line causing light is reduced, and also the bright line causing light exits toward the display region B only after undergoing lots of the scattering.

It is understood that the present invention has an increased effect of preventing bright lines more than the related art also when the gaps $F_1$ and $F_2$ are not zero. As mentioned above, the bright line preventing effect occurs because the upper and lower sides of the opening of the light concentration portion 31 are located vertically between the upper and lower sides of the light entering surface 22. Accordingly, the bent angle G denoted in FIG. 5d may have an angle of 0 to 180 degrees, and the fixing portion 32a has a rounded bend.

Also, it is reasonable that the bright line preventing effect is expected in a backlight whose light pipe has a rounded surface 2a as shown in FIG. 5b, if only employing the light source housing 33 of the present invention.

Many of bright lines are caused in the backlight whose light pipe has the rounded surface 2a as shown in FIG. 5b, and also when the light pipe is tightly held by the light source housing. Therefore, the light pipe is generally manufactured so as not to have the rounded surface 2a. Although the rounded surface 2a may be formed by an inaccurate molding process, in most cases the rounded surface 2a has a size less than 0.05 mm. Therefore, a larger amount of bright lines are caused by the case of FIG. 5a than the case of FIG. 5b.

Figure 5E:
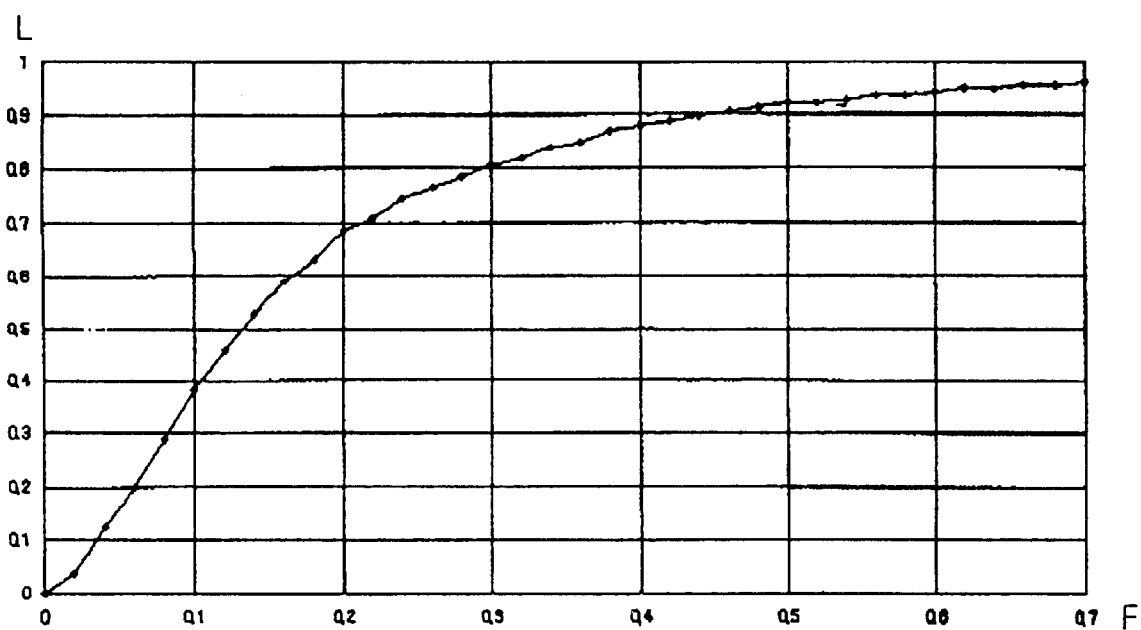
FIG. 5e is a view showing a luminance L of the bright line causing light with respect to a distance F.

Accordingly, the relationship between the gap F ($F_1$ or $F_2$) illustrated in FIGS. 5c and 5d and the bright line quantity ratio L with respect to the related art device are calculated by simulation only for the case where there is no rounded surfaces. FIG. 5e is a graph showing the relationship. For the calculation, the gap P between the upper surface of the light pipe 24 and the end of the upper fixing portion 32a was assigned a worst value of 0.1 mm, considering the tolerance. The vertical distance between the opening's upper side of the light concentrating portion 31 and the end of the upper fixing portion 32a was assigned a value of 0.3 mm, and the vertical distance D ($D_1$ or $D_2$) between the upper edge of the light entering surface 22 and the opening's upper side of the concentrating portion 31 was assigned a value of 0.2 mm. As shown in FIG. 5e, more than 80% of the bright line causing light of the related art device enters the light pipe with the gap F larger than 0.3 mm. That is, the bright line preventing effect of the first embodiment is reduced for a large value of the gap F. Accordingly, it is preferable that the fixing portions 32a and 32b are bent so as to closely encompass the upper and lower side of the light entering surface 22, respectively.

The selection of a preferable value for D/F depends on what kinds of dispersion film, lens film, and the light pipe are used. Considering the typical position and luminance of the bright line, it is preferable to select D/F to be greater than one, where $C_2$ is less than 45 degrees. In this case, the bright line preventing effect of the first embodiment is remarkable compared to the related art device. Of course, even when D/F is less than one, the first embodiment has a high bright line preventing effect in comparison with the related art device.

When D has a large value, F is permitted to have a large value as well. Because the vertical width of the light entering surface is 2 to 3 mm, D has an upper limit. Because vertical position error or width error of the light entering surface is about 0.1 mm, D cannot be less than 0.1 mm. However D is permitted to have a lower limit of 0.05 mm, provided that with the reflecting plate 26 being outside of the light source housing 33, the light pipe 24 is tightly held by the light source housing 33 so as to have minimum position or width error. Accordingly, D is preferably in the range of 0.05 mm to 0.4 mm. It is preferable to select a value of between 0.05 mm and 0.5 mm for the vertical distance between the upper side of the opening of the light concentrating portion 31 and a portion of the inner surface of the upper fixing portion 32a lying in an imaginary plane extending from the light entering surface 22. From the explanation above, it can be understood that it is preferable to select F to be less than 0.5 mm to effectively prevent the bright line.

There are various methods to limit F to be less than 0.5 mm: (1) fixing the light source housing to the light pipe with a screw or a pin therethrough; (2) fitting a protrusion of the light pipe into a hole of the light source housing; (3) protrusions or holes on end surfaces, except the light entering surface, are coupled to holes or protrusions of a main support as a base frame of the backlight; and (4) attaching the inner surfaces of the fixing portion of the light source housing to the light pipe with an adhesive.

Figure 7A:
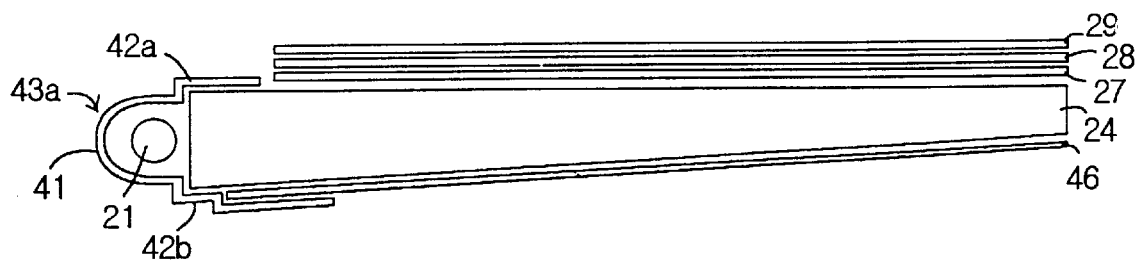
FIG. 7a is a sectional view showing a second embodiment of the present invention.
Figure 7B:
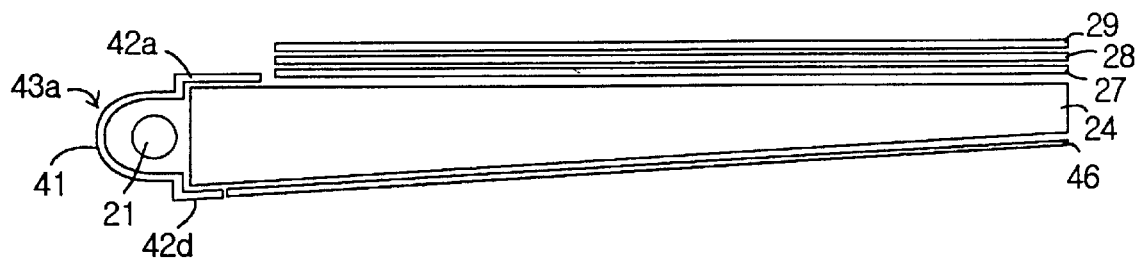
FIGS. 7b, 7c and 7d are views showing modifications of the second embodiment.

A second embodiment is described as follows referring to FIGS. 7a and 7b.

This embodiment is different from the first embodiment in that lower fixing portions 42b and 42d are in contact with the lower surface of the light pipe 24. In this embodiment, the lower fixing portion 42b may cover a reflecting plate 46 as shown in FIG. 7a, or the lower fixing portion 42d may not cover the reflecting plate 46 as shown in FIG. 7b.

Figure 1:
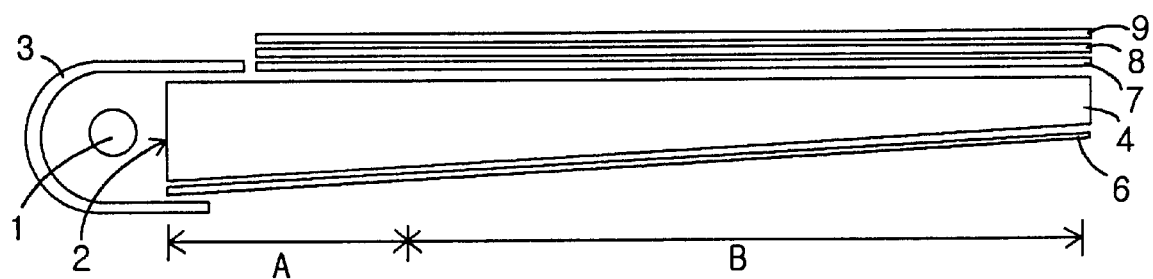
FIG. 1 is a sectional view showing a conventional backlight.
Figure 2A:
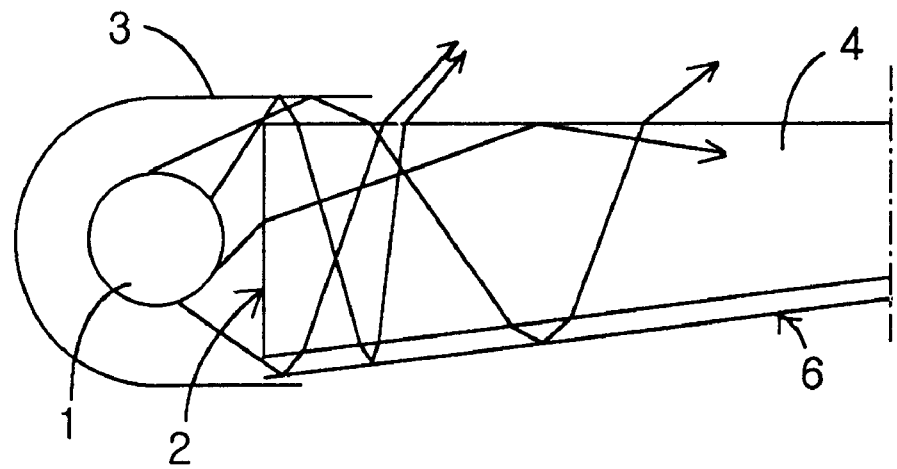
FIGS. 2a and 2b are views for explaining how a bright line is generated in the related art.
Figure 2B:
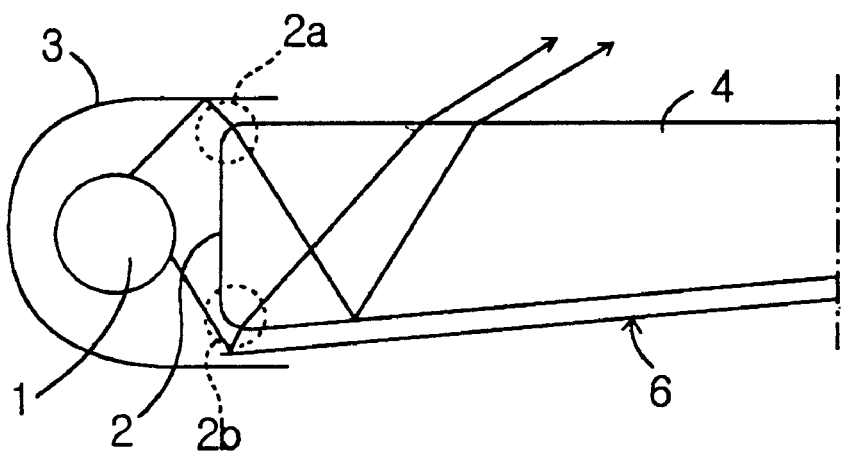
Figure 2C:
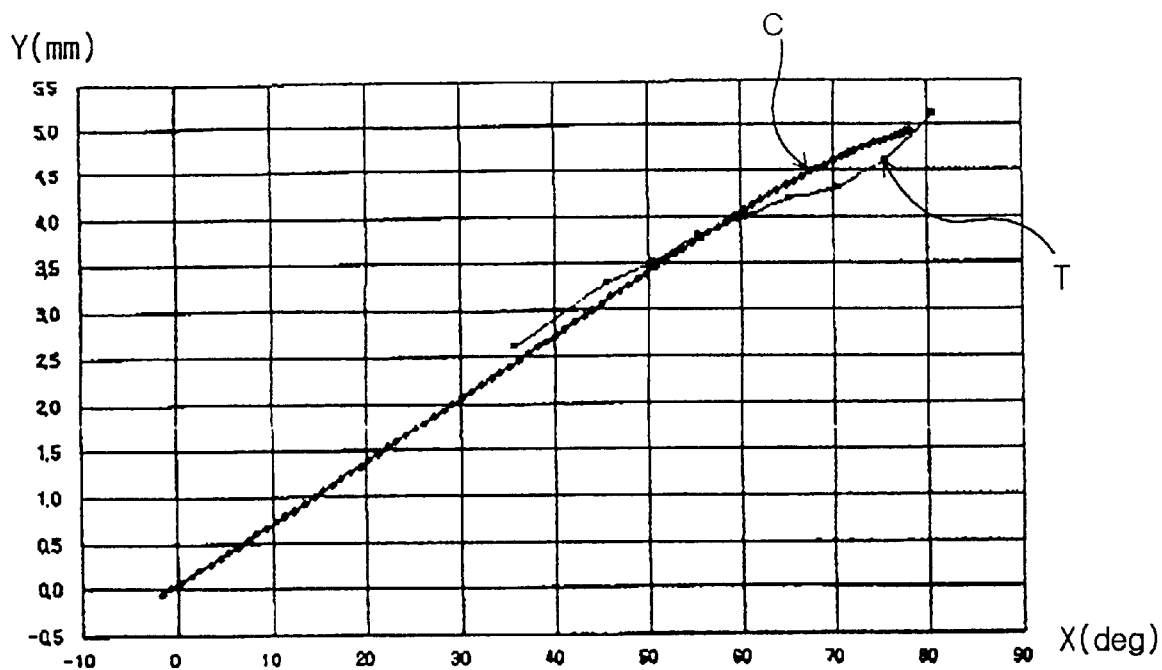
FIG. 2c is a graph showing the exit position Y with respect to the exit angle X in the related art.
Figure 2D:
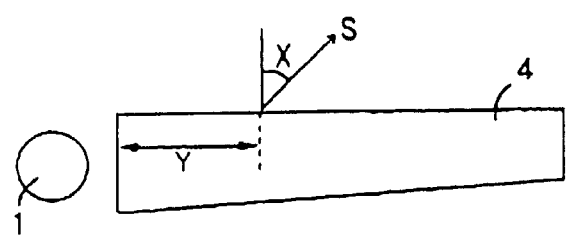
FIG. 2d is a view for explaining the exit angle X and the exit position Y.

As shown in FIGS. 1 and 4a, the illuminance of the bright line is proportional to the quantity of the light entering the gap between the light source housings 3 and 33 and the upper and lower surfaces of the light pipes 4 and 24. Therefore, the light pipes 4 and 24 should be tightly held by the light source housings 3 and 33 in order to reduce the gap. However, the tight holding causes furrows in the reflecting plates 6 and 26 when thermally expanded. For preventing the furrows, the lower fixing portion of the light source housing 41 is once more bent so as to hold only the light pipe 24 without the reflecting plate 46 being held as shown in FIG. 7a. Further, the reflecting plate 46 is outside of the light source housing 43a and the lower fixing portion 42d of the light source housing 41 holds only the light pipe 24. Therefore, the reflecting plate is not furrowed also when the light pipe 24 is tightly gripped by the light source housing made of a hard material in order to decrease the gap between the light source housing and the upper and lower surfaces of the light pipe 24. Thus, there are many freedoms for selecting the material for the light source housing 43a, and the bright line can be much more prevented by decreasing the gap.

Figure 7C:
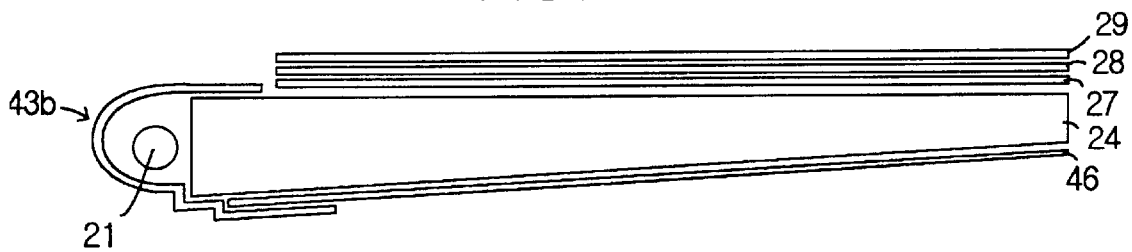
Figure 7D:
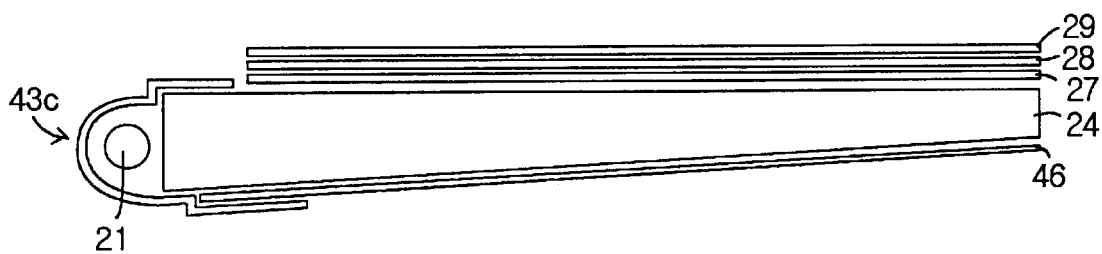

In this embodiment, only the lower part of the light source housing 43b may have the bright line preventing structure as shown in FIG. 7c, or only upper part of the light source housing 43c may have the bright line preventing structure as shown in FIG. 7d. Further, the light source housing 43a may not cover the reflecting plate 46.

Figure 8A:
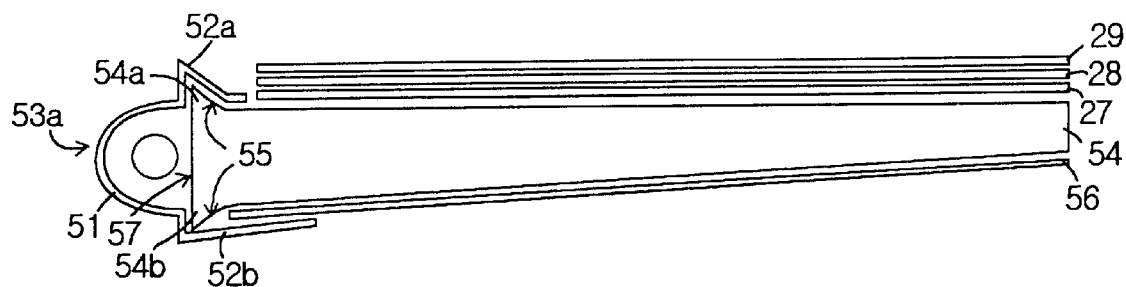
FIG. 8a is a sectional view showing a third embodiment of the present invention.

FIG. 8a is a view showing a third embodiment. As shown in this Figure, in this embodiment, the light pipe 54 has upper and lower transparent protrusions 54a and 54b, respectively, on the upper and lower surfaces in a region adjacent to its light entering surface 57. Each of the transparent protrusions 54a and 54b has such an inclined surface 55 such that the light pipe 54 has a larger thickness, the closer to the light entering surface 57. Namely, an inner angle between the inclined surface 55 and the light entering surface 57 is set to be less than 90 degrees.

An upper fixing portion 52a of the light source housing 53a has an inner surface encompassing the upper transparent protrusion 54a. Therefore, the upper transparent protrusion 54a is trapped in the upper fixing portion 52a so that the light pipe 54 is fixed to the light source housing 53a. In this case, it is possible that each of the upper and lower fixing portions 52a and 52b has a hole through which each of the upper and lower protrusions 54a and 54b are inserted to fix the light pipe 54.

This embodiment has a bright line preventing structure as in the first embodiment where the opening's upper and lower sides of the concentrating portion 51 are located vertically between the upper and lower sides of the light entering surface 57. Due to the transparent protrusions 54a and 54b, the light entering surface 57 a larger area than that of the first embodiment, and has an inner space larger than that of the first embodiment. Further, the transparent protrusions 52a and 52b can be tightly gripped by the upper and lower fixing portions 52a and 52b in order to decrease the gap between the light source housing and the upper and lower surfaces of the light pipe 54, preventing the bright line.

The transparent protrusions 54a and 54b can be formed to be integrated with the light pipe 54 as shown in FIG. 8a. The transparent protrusions can be also formed by attaching a transparent material to the light pipe. Further, they can be formed by coating a transparent organic material on the light pipe and patterning by a photolithography process.

Figure 8B:
FIGS. 8b to 8f are views showing various modifications of the third embodiment.
Figure 8C:
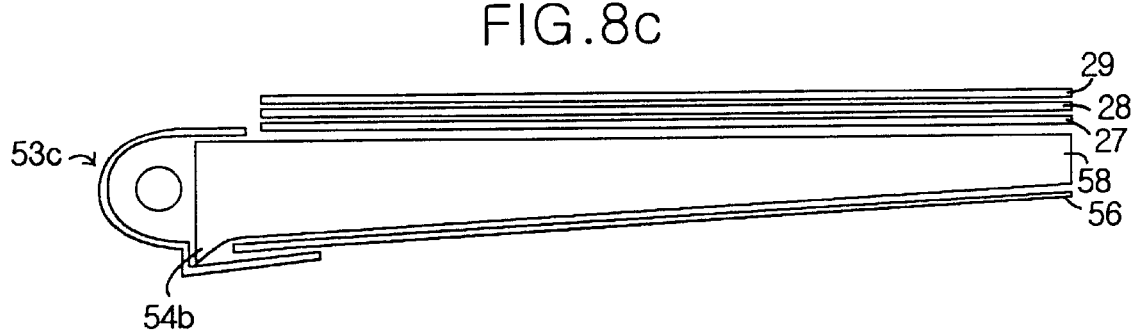
Figure 8D:
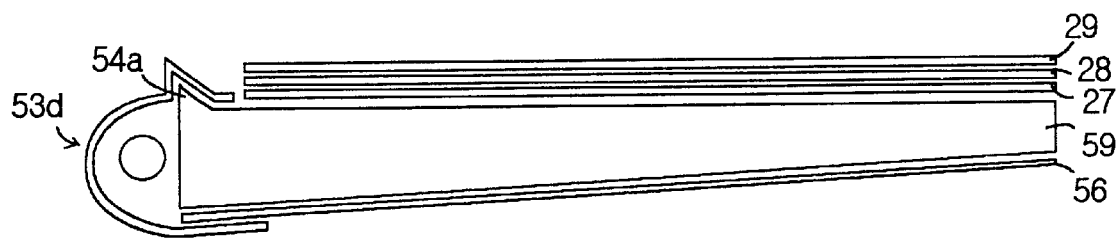
Figure 8E:
Figure 8F:
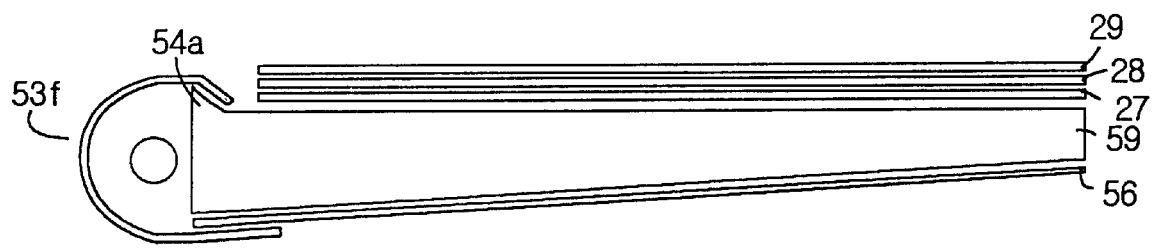

This embodiment features the transparent protrusions on the upper and lower surfaces of the light pipe. However, it is possible, as shown in FIG. 8b, that the light pipe 58 has only the lower transparent protrusion 54b, and the upper and lower parts of a light source housing 53b have the bright line preventing structure. It is also possible that as shown in FIG. 8c, that the light pipe 58 has only the lower transparent protrusion 54b, and only the lower part of a light source housing 53c has the bright line preventing structure. Further, it is possible that as shown in FIG. 8d, that a light pipe 59 has only the upper transparent protrusion 54a; only the upper part of a light source housing 53d has the bright line preventing structure; and an upper fixing portion of the light source housing 53d is shaped to encompass the upper transparent protrusion 54a. Furthermore, it is possible, as shown in FIG. 8e, that the light pipe 59 has only the upper transparent protrusion 54a; only the upper part of a light source housing 53e has the bright line preventing structure; and an upper fixing portion of the light source housing 53d is shaped not to encompass the upper transparent protrusion 54a. In addition, it is possible, as shown in FIG. 8f, that the light pipe 59 has only the upper transparent protrusion 54a; a light source housing 53f does not have the bright line preventing structure like the above-mentioned embodiments; and an inner surface of the light source housing 53f includes a portion facing and formed along the inclined surface of the upper transparent protrusion 54a.

Figure 9A:
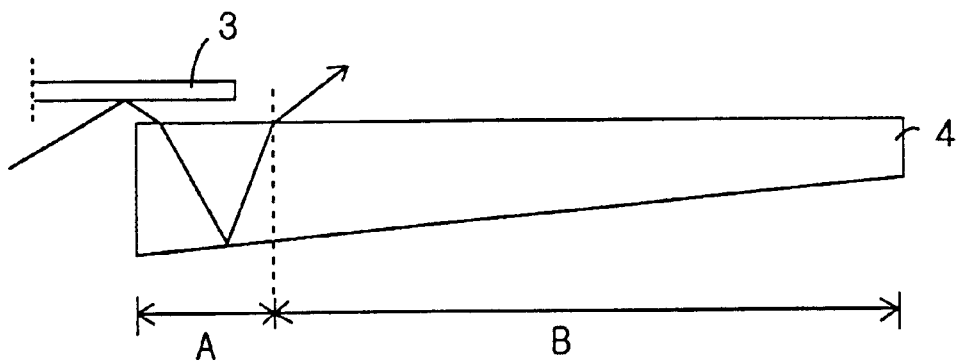
FIG. 9a is a view showing a path of the bright line causing light in the light pipe of the related art.
Figure 9B:
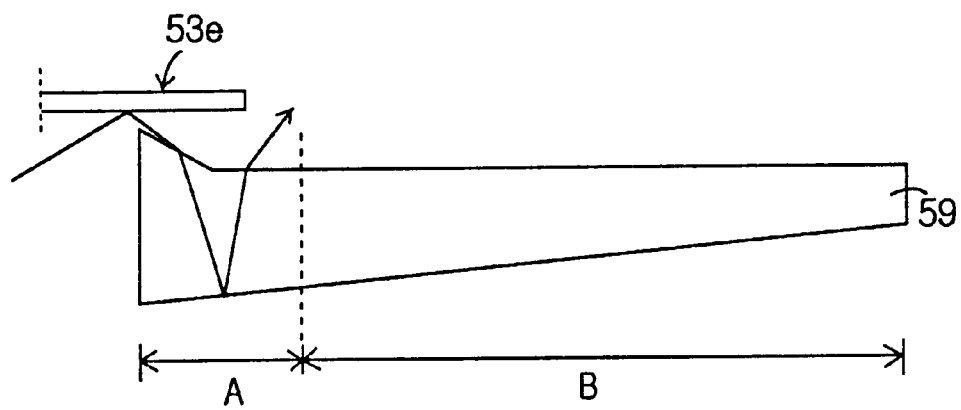
FIGS. 9b and 9c are views for explaining the bright line preventing effect of the third embodiment.
Figure 9C:
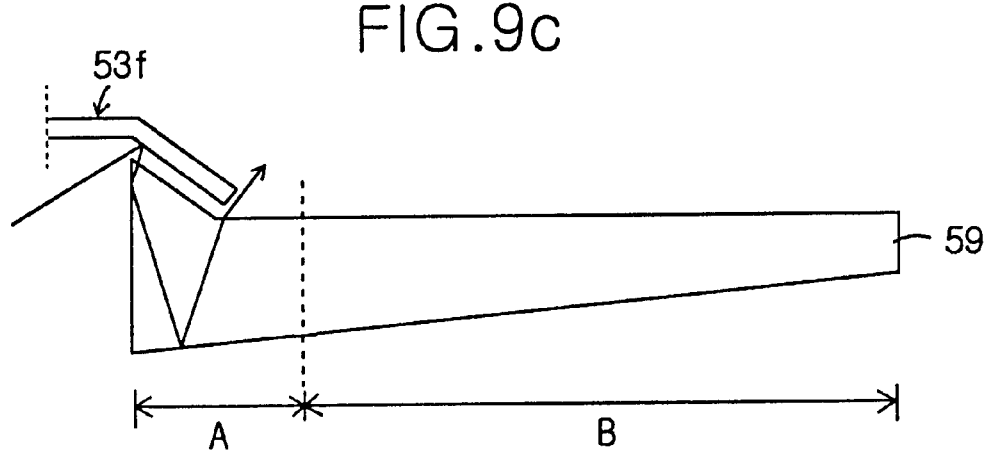

Bright line preventing effects of the transparent protrusions 54a and 54b are explained as follows, referring to FIGS. 9a, 9b, and 9c. FIG. 9a is drawn based on the related art device as shown in FIG. 1; FIG. 9b is drawn based on the case of a device as shown in FIG. 8e; and FIG. 9c is drawn based on the case of a device as shown in FIG. 8f.

Because the light pipe has a refractive index higher than the air, light enters the light pipe with a refractive angle smaller than the incident angle, according to Snell's Law. Therefore, as shown in FIG. 9a, the bright line causing light in the prior art reaches far away from the light entering surface to be directed to the display region B. On the other hand, as shown in FIGS. 9b and 9c, the width between the entering position and the exit position on the upper surface of the light pipe is reduced due to the transparent protrusion, so that the bright line causing light has a low possibility to reach the display region B.

Figure 10:
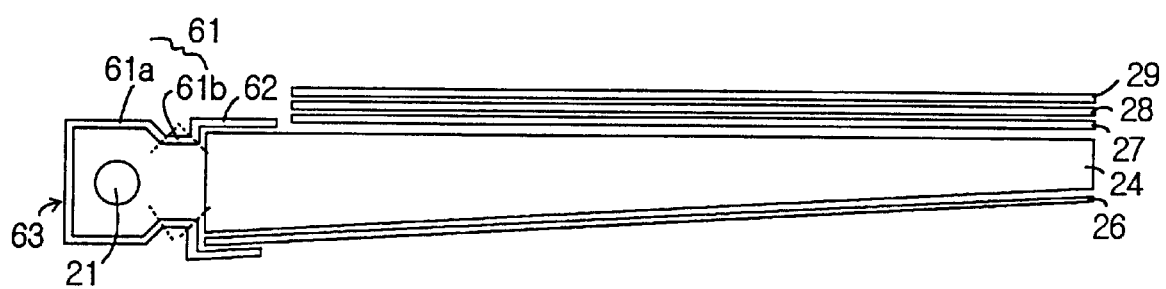
FIG. 10 is a sectional view showing a fourth embodiment.

FIG. 10 show a fourth embodiment. As shown in this Figure, this embodiment is different from the first embodiment in that the light source housing 63 has an inner space larger than the first embodiment.

In this embodiment, a concentrating portion 61 is divided into first and second concentrating portions 61a and 61b. Dotted lines shown in FIG. 10 indicate a boundary between the first and second concentrating portions. A light source 21 is located within the first concentrating portion 61a. In order to obtain a sufficient space to accommodate the light source, the first concentrating portion 61a has an inner space larger than the second concentrating portion 61b. More strictly, vertical inner width of the first concentrating portion 61a is larger than vertical inner width of the second concentrating portion 61b which is defined as a distance between the upper and lower boundaries of the second concentrating portion 61b and the fixing portion 62. Although the concentrating portions 61a and 61b are each shown to have square-shaped surfaces, they can also have a rounded surface.

The backlight of the present invention can be used as a collimated illuminating source for any other devices as well as the liquid crystal display device.

The embodiments described herein can provide the following advantages.

Referring to FIG. 4a, the upper and lower sides of the opening of the light concentrating portion 31, namely, the boundaries between inner surfaces of the light concentrating portion 31 and the fixing portions 32a and 32b, are located vertically between the upper and lower sides of the light pipe 24. Therefore, the light is prevented from entering the gap, and is reflected onto the inner surface of the light concentrating portion 31 to enter the light pipe 24 through the light entering surface 22, so that the entering light contributes to improve the brightness of the collimated light. Accordingly, the present invention overcomes the problems of the related art devices which remove the bright line by light scattering or absorption. Further, because each of the fixing portions 32a and 32b each have an inner surface opposed to the light entering surface 22, the light source 21 has a low possibility of being damaged by a shaken light pipe.

It will be apparent to those skilled in the art that various modifications and variation can be made in the backlight of the present invention without departing from the scope of the invention. Thus, it is intended that the present invention cover the modifications and variations of this invention provided they come within the scope of the appended claims and their equivalents.

What is claimed is:

1. A backlight of a liquid crystal display device, comprising: a light pipe having a top surface, a bottom surface, and a light entering surface, wherein the top surface is connected to the light entering surface at a first boundary and the bottom surface is connected to the light entering surface at a second boundary;
a light source facing the light entering surface; and
a light source housing, including a light concentrating portion and a fixing portion;
wherein the light concentrating portion has an inner space in which the light source is located, and has an opening facing the light entering surface;
wherein the fixing portion is connected to the light concentrating portion at the opening and has a horizontal portion facing at least one of the top and bottom surfaces and a vertical portion covering at least one edge portion of the light entering surface in a vicinity of one of the first and second boundaries; and
wherein a vertical distance (D) between the upper side of the light source housing and the top surface of the light pipe and a horizontal distance (F) between the light entering surface of the light pipe and the upper side of the opening of the light concentration is arranged such that a ratio of D/F is greater than one.

2. The backlight according to claim 1, wherein a vertical distance between at least one of the first and second sides of the light concentrating portion and one of the first and second boundaries which is closer to the one side is greater than a horizontal distance between the one side and the end surface of the light pipe.

3. The backlight according to claim 1, wherein a vertical distance between at least one of the first and second sides and one of the first and second boundaries which is closer to the one side is in between 0.05 mm to 0.4 mm.

4. The backlight according to claim 1, wherein a horizontal distance between the first side the light concentrating portion and the end surface of the light pipe is less than 0.5 mm.

5. The backlight according to claim 1, wherein a vertical distance between one of the first and second sides of the light concentrating portion and an inner surface of the fixing portion, lying in a region which is crossed with an imaginary extension plane of the end surface of the light pipe, is between 0.05 mm to 0.5 mm.

6. The backlight according to claim 1, wherein a vertical distance between at least one of the first and second sides and one of the first and second boundaries which is closer to the one side is more than 0.1 mm.

7. The backlight according to claim 1, wherein the fixing portion is bent to encompass at least one of the first and second boundaries.

8. The backlight according to claim 7, wherein the fixing portion is bent at a right angle.

9. The backlight according to claim 7, wherein the fixing portion is bent at an angle between 0 degrees to 180 degrees.

10. The backlight according to claim 7, wherein the fixing portion is bent with a rounded bend.

11. The backlight according to claim 1, further comprising a reflecting plate facing the bottom surface of the light pipe, and wherein a part of the fixing portion is in contact with the bottom surface and an end of the reflecting plate is inserted into a gap between the end portion of the fixing portion and the first surface.

12. The backlight according to claim 1, further comprising a reflecting plate facing the bottom surface of the light pipe, and wherein a part of the fixing portion is in contact with the bottom surface and an end of the reflecting plate is horizontally spaced apart from the end portion of the fixing portion.

13. The backlight according to claim 1, further comprising a transparent protrusion which is formed on at least one of the top and bottom surfaces of the light pipe adjacent to the end surface, said protrusion having a surface inclined at an angle of less than 90 degrees with respect to the end surface.

14. The backlight according to claim 13, wherein the fixing portion is bent to encompass the transparent protrusion.

15. The backlight according to claim 13, wherein the fixing portion has a hole through which the transparent protrusion is inserted.

16. The backlight according to claim 13, wherein the fixing portion is in contact with the transparent protrusion.

17. The backlight according to claim 13, wherein the fixing portion has an inner surface parallel to and facing the inclined surface.

18. The backlight according to claim 1, wherein the light concentrating portion includes a first light concentrating section and a second light concentrating section;

wherein the first light concentrating section is connected to the fixing portion by the second light concentrating section;

wherein a horizontal cross-section of the first light concentrating section is larger than a horizontal cross-section of the opening of the light concentrating portion.

19. A backlight of a liquid crystal display device, comprising a light pipe which has a top surface, a bottom surface, and an end surface as a light entering surface; and a portion of the fixing portion is in contact with the bottom surface of the light pipe and another portion of the fixing portion is above a portion of the reflecting plate;

wherein a transparent protrusion is formed on at least one of the top and bottom surfaces adjacent to the end surface and has a surface inclined at an angle less than 90 degrees with respect to the end surface.

20. A backlight of a liquid crystal display device, comprising:

a light pipe having a top surface, a bottom surface, and a light entering surface, wherein the top surface is connected to the light entering surface at a first boundary and the bottom surface is connected to the light entering surface at a second boundary;

a reflecting plate facing the bottom surface of the light pipe;

a light source facing the light entering surface; and a light source housing, including a light concentrating portion and a fixing portion;

wherein the light concentrating portion has an inner space in which the light source is located, and has an opening facing the light entering surface;

wherein the fixing portion is connected to the light concentrating portion at the opening and has a horizontal portion facing at least one of the top surface of the light pipe and the reflecting plate, and a vertical portion covering at least one edge portion of the light entering surface in a vicinity of one of the first and second boundaries; and wherein a portion of the fixing portion is in contact with the bottom surface of the light pipe and another portion of the fixing portion is above a portion of the reflecting plate in order to prevent furrows.

* * * * *